J. J. MAHONEY & W. L. NORRIS.
PIPE LAYING MACHINE.
APPLICATION FILED MAY 25, 1915. RENEWED SEPT. 18, 1916.
1,210,824.
Patented Jan. 2, 1917.
3 SHEETS—SHEET 1.
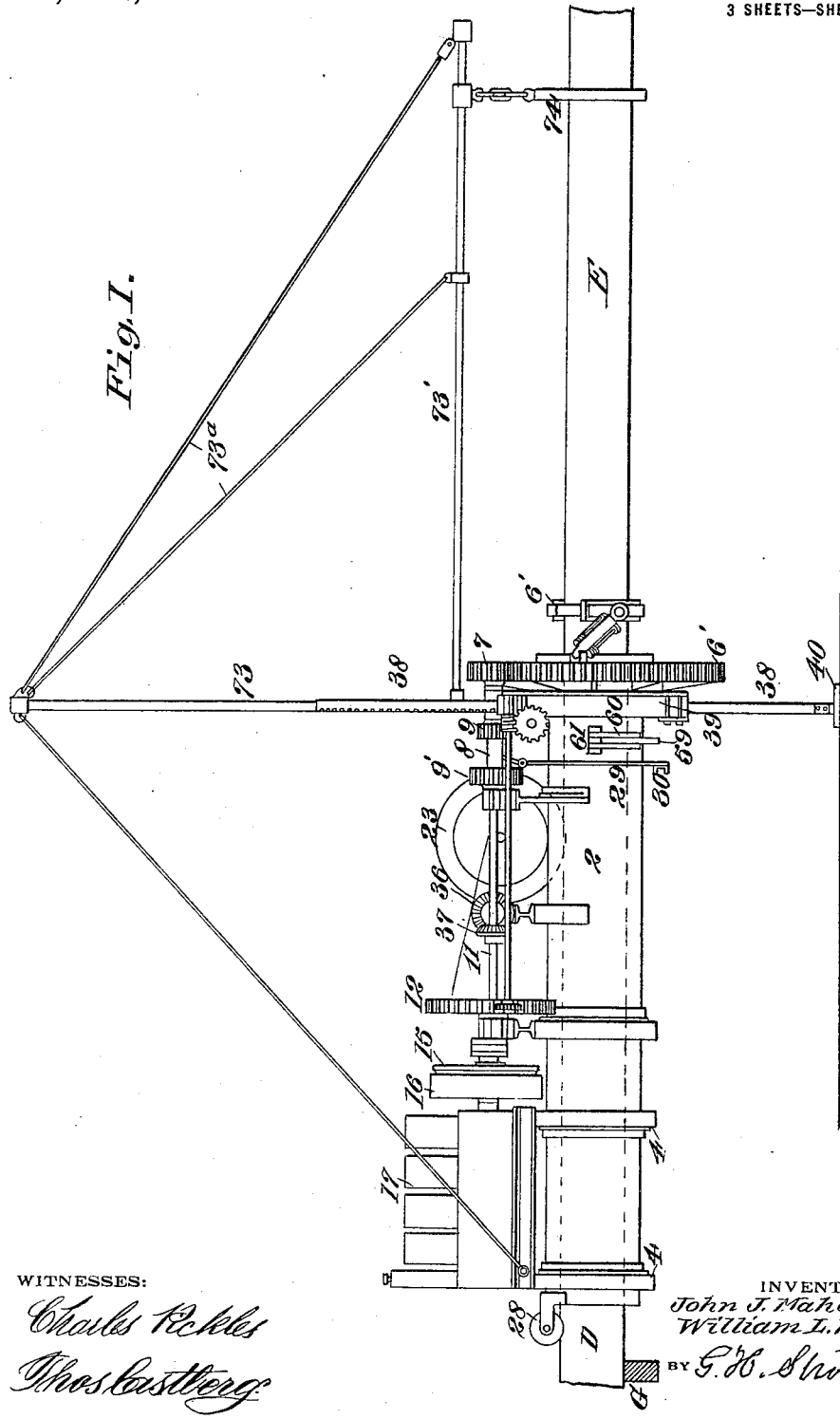
WITNESSES:
Charles Pickles
Thos Castberg
INVENTORS
John J. Mahoney
William L. Norris
BY G. H. Strong.
ATTORNEY

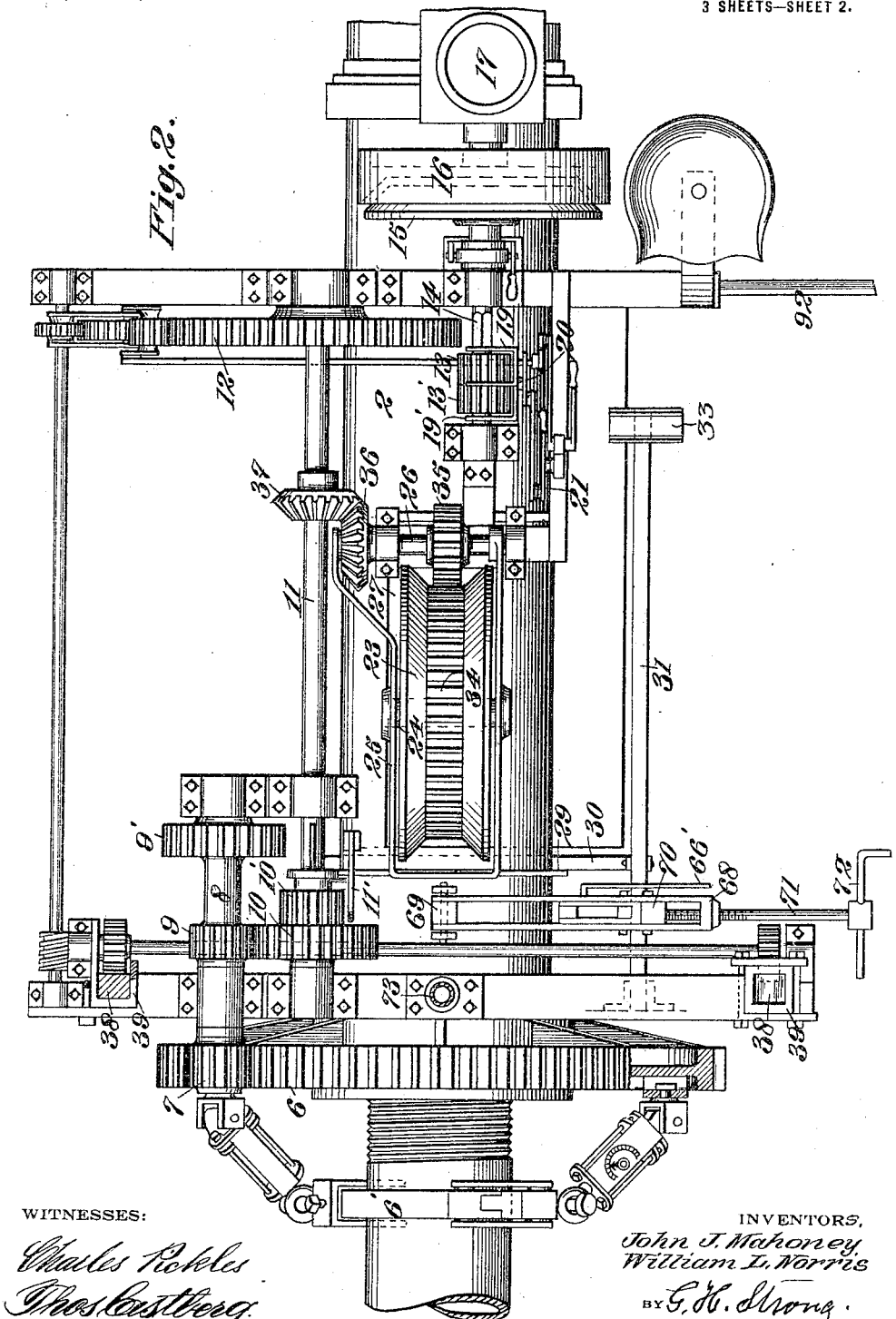

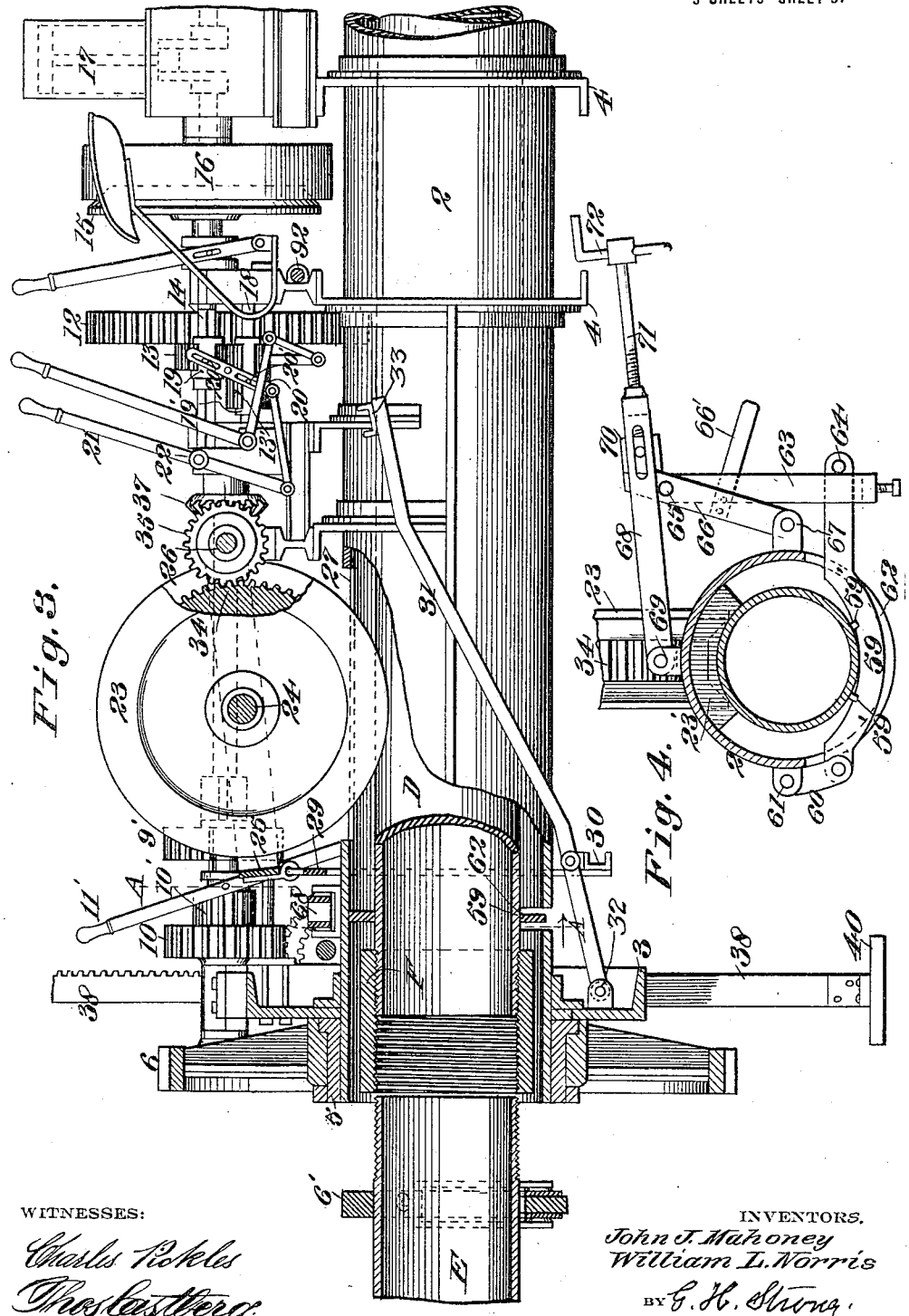

UNITED STATES PATENT OFFICE.

JOHN J. MAHONEY, OF SAN FRANCISCO, AND WILLIAM L. NORRIS, OF BERKELEY, CALIFORNIA, ASSIGNORS TO CALIFORNIA PIPE LINE MACHINE CO., OF SAN FRANCISCO, CALIFORNIA, A CORPORATION OF CALIFORNIA.

PIPE-LAYING MACHINE.

1,210,824. Specification of Letters Patent. Patented Jan. 2, 1917.

Original application filed May 7, 1913, Serial No. 766,056. Divided and this application filed May 25, 1915, Serial No. 30,340. Renewed September 18, 1916. Serial No. 120,887.

*To all whom it may concern:*

Be it known that we, JOHN J. MAHONEY, of the city and county of San Francisco and State of California, and WILLIAM L. NORRIS, of Berkeley, in the county of Alameda and State of California, citizens of the United States, have invented new and useful Improvements in Pipe-Laying Machines, of which the following is a specification.

This invention relates to a pipe laying and screwing machine, and has for its object to provide for the ready and easy transportation of such a machine from place to place upon a pipe line. In carrying out this object we employ a pipe laying machine which is so constructed as to travel upon the connected sections of pipe, thus facilitating laying of the pipe across rough and uneven ground, marshy land, creeks, gulleys, ditches and over obstacles; the pipe thus forming a track on which the machine travels in moving from one section to another.

One form which our invention may assume is exemplified in the following description and illustrated in the accompanying drawings, in which—

Figure 1 is a side elevation of a machine embodying our invention. Fig. 2 is a plan view of the same; Fig. 3 is a view in elevation from the side of a machine opposite to that shown in Fig. 1, with parts broken away and partly in vertical section. Fig. 4 shows a detail section on the line A—A of Fig. 3, illustrating the mechanism for clamping the machine to the pipe line.

In the drawings, the frame or carriage body of the machine is indicated at 2, and is here shown as consisting of a tubular member adapted to surround the pipe to be laid. This carriage body 2 is preferably formed of a large diameter of pipe. The forward end of the carriage body 2 extends through and is secured to a channel plate 3, and is provided with similar channel plates 4 throughout its length to form suitable supports for the bearings of various mechanisms to be hereinafter described.

Revolubly mounted on a bushing 5, secured to the forward end of the carriage 2, is a toothed wheel 6, which wheel is adapted to be rotated by means of a pinion 7, carried on a short shaft 8, journaled in suitable bearings. The shaft 8 carries a pair of spaced toothed wheels 9 and 9' which are adapted to be engaged by toothed wheels 10 and 10' of different diameters, mounted to move longitudinally on a countershaft 11 and revoluble therewith. The toothed wheels 10 and 10' are adapted to be shifted by means of a hand lever 11' to throw the toothed wheel 10 into engagement with the toothed wheel 9, the toothed wheel 10' into engagement with the toothed wheel 9', or dispose the toothed wheels 10 and 10' between the toothed wheels 9 and 9' out of engagement therewith. The wheel 6 has connected to it a pipe gripping member 6' and with other mechanism, not necessary to be here specifically described, constitutes the pipe screwing means which forms the subject-matter of a separate application filed of even date herewith, Serial Number 30,341.

The toothed wheels 9 and 10 and 9' and 10' are of different diameters in relation to each other for the purpose of varying the speed of rotation of the shaft 8, and consequently the pinion 7 and toothed wheel 6 in relation to the countershaft 11, as is common in change speed mechanism. The countershaft 11 extends parallel with the carriage 2 and is revolubly mounted in suitable bearings carried by the channel plates 3 and 4. A toothed wheel 12 is mounted on the countershaft 11 and is adapted to be engaged by either one of two pinions 13 and 13'.

The pinion 13 is slidably mounted on the squared portion of a shaft 14, on which is mounted a friction disk 15, adapted to be thrown in and out of engagement with the fly-wheel 16 on the drive shaft of a suitable engine or motor 17, mounted on the carriage 2. The pinion 13' is an idler and is loosely mounted on a stud shaft 18 and is in constant mesh with the pinion 13. The pinions 13 and 13' are designed to slide lengthwise on their respective shafts 14 and 18 and are adapted to be thrown alternately in and out of engagement with the toothed wheel 12 to rotate the latter and the shaft 11 when the shaft 14 is connected with the engine shaft through the clutch 15 and fly-wheel 16.

The means for shifting the pinions 13 and 13' is here shown as consisting of yokes 19 and 19', which are slidably mounted on the shafts 14 and 18 and extend on the opposite sides of the pinions 13 and 13'. The yokes 19 and 19′ are connected together by means of a link 20 which is slotted longitudinally to receive pins 20′ carried by the yokes 19 and 19′. The lower end of the link 20 is connected to a hand lever 21, fulcrumed at 22, in such a manner that when the hand lever 21 is rocked, the link 20 will operate to move the pinion 13 in one direction and the pinion 13′ in the opposite direction. The pinions 13 and 13′ have a limited movement on their respective shafts 14 and 18, and are so arranged and positioned, in relation to each other, that when disposed in an intermediate position, as shown in Fig. 2, the pinions 13 and 13′ will be out of engagement with the gear 12. By shifting the hand lever 21 to the right the pinion 13 will be thrown into mesh with the toothed wheel 12 to drive the latter directly from the shaft 14, and when the hand lever 21 is thrown to the extreme position to the left, the pinion 13 will be moved out of mesh with the toothed wheel 12 and the pinion 13′ will be thrown into mesh with the toothed wheel 12, so that the latter will be rotated indirectly from the shaft 14 through the pinions 13 and 13′; the pinion 13′ being of such width as to be engaged by the pinion 13 when the latter is in its outermost position.

By the operation of the hand lever 21 to shift the pinions 13 and 13′, as just described, the direction of rotation of the toothed wheel 12 and countershaft 11 may be varied as desired, and rotated by means of the engine 17 through the clutch 15 and shaft 14.

The carriage 2 is designed to travel and be propelled in either direction on the pipe line for constructing which this machine is designed. For this purpose a tractor wheel 23 is provided, adjacent to the forward end of the machine, which tractor wheel is revolubly mounted on a shaft 24, carried by a yoke 25, pivotally mounted on a shaft 26, journaled in suitable bearings on the carriage 2. The tractor wheel 23 is formed with outwardly flared flanges on its periphery and extends through an opening 27 in the carriage frame 2 so as to contact and ride upon the pipe D, as is particularly shown in Fig. 2; the flanges on the tractor 23 bearing on the pipe D on each side of its vertical center.

A pair of beveled trailing wheels 28, adapted to travel on the pipe D, are provided at the rear end of the carriage to form a revoluble support for this end of the carriage on the pipe D, as shown in Fig. 1. The outer end of the yoke 25 connects with a yoke 29, which yoke 29 is disposed astride of the carriage frame 2 and has a horizontally extending cross-bar 30 mounted on its lower ends a short distance below the underside of the carriage frame 2. The upper edge of the cross-bar 30 is connected to a foot lever 31, pivoted at 32 on the channel plate 3, the upper portion of which lever extends upwardly alongside of the carriage body 2 and has a foot rest 33 on its upper end. The foot lever 31 is adapted to be depressed by the weight of the operator to throw the tractor wheel 23 into operative engagement with the pipe D. The downward pressure on the outer end of the lever 31 acts to move the tractor wheel 23 downward against the pipe D and to move the forward end of the carriage body 2 in an upward direction after the tractor 23 contacts the pipe D, thus throwing the weight of the forward end of the carriage body 2 onto the tractor and thereby frictionally engaging the tractor 23 and pipe D.

The tractor wheel 23 is provided with gear teeth 34 upon its periphery, between the divergent flanges thereon, which gear teeth are normally engaged by a pinion 35 keyed on the shaft 26. The shaft 26 is provided with a beveled pinion 36 which meshes with a corresponding pinion 37, mounted on the countershaft 11 in such a manner than when the countershaft 11 is rotated the tractor wheel 23 will be rotated therewith.

Means are provided for supporting the outer end of the carriage body 2 independent of the pipe line D, and by means of which the carriage body 2 may be held securely against movement either longitudinally, laterally, or vertically. This means is here shown as consisting of a pair of vertical standards 38, which are slidably and adjustably mounted in guides 39, carried by the channel plate 3. The lower ends of the standards 38 are connected together by means of a growler board 40. The growler board 40 is adapted to rest upon the ground and span a ditch or trench and form a level support for the standards when the ground is rough and uneven. The means employed for verticaly adjusting the said carriage upon the standards need not be described here in detail as it forms the subject-matter of a separate application filed of even date herewith, Serial No. 30,339.

Means are provided for clamping or locking the carriage frame 2 to the pipe D so as to prevent rotation of the latter and also to secure the carriage body 2 against longitudinal movement. This means is particularly illustrated in Figs. 1 and 4, and consists of a curved arm 59 carrying gripping teeth 59′ pivotally attached at one end to a link 60, pivoted at 61 to one side of the carriage body 2; the arm 59 being adapted to extend through a circumferential slot 62. The slot 62 is formed on the underside of the carriage body to position the teeth 59′ on the concave upper edge of the curved arm in engagement with the underside of the pipe D. The outer end of the arm 59 extends through a link 63 and is held in engagement therewith by means of a pin 64 carried on the outer end of the arm 59. The upper end of the link 63 is pivotally connected by a pin 65 to a slotted link 66 pivoted on a stud 67 on the carriage body 2, and the upper end of the link 66 is adapted to extend into a slotted arm 68 pivoted at 69 to the carriage body 2; the upper end of the link 66 being designed to be disposed rearward of a block 70 which is reciprocally mounted in the slotted arm 68. The pivot pin 65, connecting the link 63 and the link 66, extends on opposite sides of the latter in such a manner as to engage the underside of the slotted arm 68 to support the arm on the link 66.

Mounted in the outer end of the slotted arm 68 is a threaded shaft 71, provided with a handhold 72, by means of which the shaft 71 may be rotated in its threaded bearings to advance the block 70 against the upper end of the link 66 and move the latter in a rearward direction to exert an upward pull on the link 63 and the curved arm 59 to cause the latter to bear against the underside of the pipe D. The upward movement of the pipe D, when the curved arm 59 is pulled upwardly, is opposed by a downwardly extending flange 23' mounted on the interior of the carriage body 2. The arm 59 thus serves to clamp the pipe D against the flange 23' to hold the pipe against movement and also locks the carriage body 2 thereon; the teeth 59' acting to prevent turning of the pipe D in relation to the carriage 2.

Mounted on the channel plate 3, at the front end of the machine, is a mast 73, carrying a boom 73' which extends forward of the carriage body 2 and carries a pipe-engaging hook 74, adjacent to its outer end. The boom 73' is supported by stays 73ᵃ connecting with the mast 73, which in turn is rigidly held by guys connecting with the carriage body at suitable points. This hook 74 is adapted to engage and support a length of pipe E which is to be connected to the pipe D.

The pipe gripping means 6' are provided for gripping the pipe E, when supported on the hook 74, and connecting it to the toothed wheel 6, so that when the latter is rotated the threaded end of the pipe E may be screwed in or out of a coupling F on the outer end of the pipe D.

In the operation of this invention, the pipe D is introduced into the carriage body 2, with its outer end carrying the coupling F, disposed adjacent to the outer or forward end of the carriage body 2, as shown in Fig. 3, the pipe D being supported rearward of the carriage 2 on timbers G, or in any other suitable manner. The height of the carriage 2 is regulated to position it parallel with the pipe D, so that the outer end of the pipe D will be concentric with the toothed wheel 6. The pipe E to be screwed in place is then raised to position in alinement with the pipe D. It will be seen, when the carriage 2 is supported on the standards 38, that when the timbers G are removed the outer end of the pipe D will be supported by the carriage body 2. This will permit of the pipe D being raised and lowered in unison with the carriage to dispose the carriage and the pipe on any desired plane. By removing the timbers or supports G, adjacent to the rear end of the carriage 2, the latter may be lowered sufficiently to bring the hook 74 in close proximity with the ground, where it may be engaged with a loose length of pipe E; the pipe D being of sufficient flexibility between the rear end of the carriage 2 and its supports G, which may be spaced as far rearward of the carriage as may be desired, to permit the downward movement of the forward end of the carriage 2 necessary to bring the hook 74 into engageable relation with the pipe E. When thus lowering the forward end of the machine the pipe D is freed from the clamp 59. After the hook 74 has been engaged with the pipe E, the carriage 2 is elevated, thereby lifting the pipe E clear of the ground and suspending it from the boom 73' in alinement with the axis of the toothed wheel 6 and pipe D; the carriage 2 being raised to such a point as to dispose the open end of the pipe D concentric with the toothed wheel 6, as before described.

When the parts have been positioned as just described, the pipe D is clamped rigidly to the carriage 2 by means of the curved arm 59. The arm 59 is caused to clamp the pipe D against the flange 23' by means of the toggle links 63 and 66 which are lifted into an approximately vertical position by means of a handhold 66' and are engaged at their upper ends by the block 70 in the slotted arm 68; the threaded shaft or screw 71 being turned to force the upper end of the link 66 backwardly to exert an upward pull on the link 63 and arm 59, causing the arm 59 to engage the underside of the pipe D and lift the latter upward against the flange 23'. When this is done, the pipe D will be securely held against rotation and the pipe D and the carriage body 2 will be firmly locked together. The pipe gripping means 6' is then adjusted to position on the pipe E and the screwing mechanism set in operation. When the pipe E has been screwed in position, the gripping mechanism is released therefrom and the clamping member 59 is disengaged from the pipe D by loosening the screw shaft 71 and the arm 68 which allows the links 63 and 66 to drop downwardly with the arm 59 to clear the pipe D. Timbers or blocks (not shown) are then placed beneath the pipe E at a suitable distance from the carriage 2 so as to support the pipe E, and the timbers G are placed under the pipe D adjacent to the rear end of the carriage 2. The standards 38 are then adjusted in such a direction as to be moved upwardly and thereby leave the carriage 2 supported upon the pipe D. The forward end of the carriage 2 moves downwardly into contact with the pipe D before the standards 38 begin to move upwardly.

When the standards 38 have moved sufficiently far so that the growler board 40 will clear any obstacles that may be in front thereof, the operator throws his weight on the lever 31 to depress the latter and thereby exerts a downward pull on the tractor 23 through the medium of the yokes 25—29 and the bar 30. The downward pressure on the outer end of the lever also acts to lift the forward end of the carriage 2 clear of the pipe D, when the latter is brought into contact with the tractor 23 on the downward movement thereof. By throwing in the clutch 15 motion will be transmitted to the shaft 11 through the gear 12, as before described, and from thence through the pinions 36—37, shaft 26, and pinion 35, to the tractor 23, thus rotating the latter to cause the carriage to travel forward from the pipe D onto the pipe E any suitable distance. When it is desired to bring the carriage to a stop, the operator throws out the clutch 15, and if it is necessary to brake the carriage against further movement, such as may be occasioned by momentum or inclination of the pipe D, the lever 31 is released to cause the outer end of the carriage 2 to come into frictional engagement with the pipe E. By operating the pinions 13—13′, the direction of rotation of the tractor 23 may be reversed as desired so that the carriage 2 may be propelled in either direction on the pipe D or E.

As a means for preventing the machine from tipping from side to side, when moving from one point to another on the pipe line, an outrigger 92 is provided, which outrigger is designed to be supported in any suitable manner and held against vertical movement as the carriage 2 moves backward or forward on the pipe. In practice the outrigger 92 is held manually; the various elements of the apparatus being so disposed in relation to the axial line of the carriage 2 as to be approximately balanced on each side so that the machine may be maintained in equilibrium on the pipe D by manipulating the outrigger 92 by hand. The standards 38 are then raised to clear the ground and the entire machine is moved along the pipe line. When the apparatus has been moved to the forward end of the pipe E, the standards 38 are moved downward to the position of the growler board 40 on the ground, as before described, whereupon another loose section of pipe E is picked up and the level of the carriage 2 adjusted in readiness for another pipe screwing operation, as before described.

By constructing the apparatus so as to adapt it to travel on a pipe, it is rendered possible to lay pipe lines over uneven surfaces, and by providing the adjustable standards 38 so arranged as to span a ditch or trench, the pipe line may be laid and lowered into a ditch when occasion so requires.

This application is a division of our former application Ser. No. 766,056, filed May 7, 1913, allowed November 18, 1914.

While we have shown and described but a single form of our invention herewith, it is understood, nevertheless, that it is susceptible of modification and, therefore, many changes in the construction and arrangement of the several parts may be resorted to without departing from the spirit of the invention as disclosed in the appended claims.

Having thus described our invention, what we claim and desire to secure by Letters Patent is—

1. In a pipe laying machine, a carriage formed to travel on a pipe line as a track, and pipe laying mechanism mounted on the carriage and extending in advance of the latter to lay a pipe onto which the carriage may subsequently be advanced.

2. In a pipe laying machine, a carriage, a tractor for driving the carriage when in operative engagement with the supporting surface, a support for the tractor normally holding the latter out of operative engagement with the supporting surface, and pressure bearing means for moving the tractor support to bring the tractor into operative engagement with the supporting surface.

3. In a pipe laying machine, the combination of a carriage adapted to travel on a pipe line as a track, pipe laying mechanism on the carriage, common power operated means for driving said carriage and pipe laying mechanism, and means for rendering the first means inoperative relative to either the mechanism or carriage.

4. In a pipe laying machine, a carriage formed to travel on a pipe line, pipe laying mechanism mounted on the carriage and extending in advance of the latter, said mechanism including means for alining a pipe section to the pipe line and means for securing the pipe section to the pipe line, and power means for driving the carriage and operating the pipe laying mechanism.

5. In a pipe laying machine, the combination of a carriage, pipe laying mechanism on the carriage, a tractor for said carriage adapted to travel on a pipe line as a track, common means for driving said tractor and said pipe laying mechanism, and means for moving said tractor into and out of engagement with the pipe line to render the tractor operative and inoperative for moving the carriage.

6. In a pipe laying machine, the combination of a carriage movable on a pipe line, pipe laying mechanism on the carriage, and means for driving said carriage on the pipe line in either direction.

7. In a pipe laying machine, a carriage, a tractor for driving the carriage when in operative engagement with the supporting surface, a support for the tractor mounted on the carriage and normally holding the tractor out of operative engagement with the supporting surface, and manually operable means for exerting pressure on the tractor support to move the tractor into operative engagement with the supporting surface.

8. In a pipe laying machine, the combination of a carriage, pipe laying mechanism on the carriage, a tractor on the carriage adapted to travel on a pipe line as on a track, normally out of operation with the track, a motor mounted on said carriage, common means for driving said tractor and pipe laying mechanism from said motor, and means for moving the tractor into operative engagement with the pipe for driving the carriage.

9. A pipe laying machine, having a carriage, pipe laying mechanism on the carriage, a running gear on said carriage adapted to travel on a cylindrical surface for driving the carriage and normally out of operative engagement with the said surface, common means for driving said laying mechanism and running gear, and means for throwing said running gear into its operative position.

10. A pipe laying machine, having a tubular carriage, a running gear on said carriage adapted to travel on a cylindrical surface and normally out of operative contact with said surface, pipe laying mechanism on the carriage operable when the latter is stationary, means for throwing said running gear into contact with the surface for driving the carriage, said means comprising a pivoted bearing on which said running gear is mounted, and means for adjusting said bearing vertically to raise or lower said running gear in relation to said carriage, and a common drive means for the laying mechanism and running gear.

11. A pipe laying machine, a carriage, a beveled tractor thereon adapted to travel on a cylindrical pipe extending through said tubular carriage for moving the carriage on the pipe when in operative engagement therewith, means for throwing the tractor in and out of operative engagement with the pipe, pipe laying mechanism on the carriage, common means for rotating said tractor and operating the mechanism, and means for holding the pipe against the tractor.

12. In a pipe laying machine, a carriage provided with an opening, a tractor movable through the opening of the carriage into operative engagement with the supporting surface for driving the carriage, a swingingly mounted tractor support on the carriage, and means for swinging the tractor support to move the tractor through the carriage opening into and out of operative engagement with the supporting surface.

13. In a pipe laying machine, the combination of a carriage adapted to travel on a pipe, means for clamping the pipe against said carriage comprising a curved lever mounted on the carriage engageable with the underside of the pipe, pivotally connected links having one link connected to the outer end of the curved arm, and the other link connected at its outer end to the carriage, and means for operating said links to move their outer ends toward one another and locking the links against movement.

14. In a pipe laying machine, the combination of a carriage adapted to travel on a pipe, means for clamping the pipe against said carriage comprising a curved lever mounted on the carriage engageable with the underside of the pipe, pivotally connected links having one link connected to the outer end of the curved arm and the other link connected at its outer end to the carriage, an arm mounted on the carriage, and a threaded shaft carried by said arm engageable with the links to move their outer ends toward each other.

15. In a pipe laying machine, a carriage, a tractor adapted to travel on the curved surface of a pipe for driving the carriage, a rockable yoke on which said tractor is journaled, pipe laying mechanism on the carriage, common means for rotating said tractor and laying mechanism, and means for depressing the yoke to throw the tractor into operable engagement with the curved surface of the pipe.

16. In a pipe laying machine, the combination of a carriage movable on a pipe line, pipe laying mechanism on the carriage for laying a pipe line to serve as a track for the carriage to travel on, and common means for operating the carriage and pipe laying mechanism.

17. In a pipe laying machine, a carriage adapted to travel on a pipe line as a track, pipe laying mechanism on the carriage, a tractor for the carriage adapted to engage with the pipe line for driving the carriage, means for moving the tractor in and out of engagement with the pipe line, and common means for driving the tractor and the pipe laying mechanism.

18. In a pipe laying machine, a carriage adapted to travel on a pipe line as a track and provided with an opening, pipe laying mechanism on the carriage, a tractor mounted on the carriage for movement through the opening into engagement with the pipe line for driving the carriage, means for moving the tractor through the opening of the carriage to and from engagement with the pipe line, and common means for operating the tractor and pipe laying mechanism.

19. In a pipe laying machine, a carriage adapted to travel on a pipe line as a track and provided with an opening, pipe laying mechanism on the carriage, a tractor mounted on the carriage for movement, said tractor comprising a wheel having spaced peripheral flanges and interposed gear teeth, common tractor and laying mechanism driving means including a gear meshing with the gear teeth of the tractor, the peripheral flanges of the tractor being adapted to engage the pipe line through the carriage opening for driving the carriage, and means for moving the tractor to and from the pipe line.

In testimony whereof we have hereunto set our hands in the presence of two subscribing witnesses.

JOHN J. MAHONEY.
WILLIAM L. NORRIS.

Witnesses:
JOHN H. HERRING,
W. W. HEALEY.

Copies of this patent may be obtained for five cents each, by addressing the "Commissioner of Patents, Washington, D. C."